United States Patent [19]
Van Reenen et al.

[11] Patent Number: 5,847,911
[45] Date of Patent: Dec. 8, 1998

[54] SELF-PROTECTING SWITCH APPARATUS FOR CONTROLLING A HEAT ELEMENT OF A VEHICLE SEAT AND A METHOD FOR PROVIDING THE APPARATUS

[75] Inventors: David G. Van Reenen, Livonia; James R. Goings, Novi, both of Mich.

[73] Assignee: TRW Inc., Lyndhurst, Ohio

[21] Appl. No.: 974,869

[22] Filed: Nov. 20, 1997

[51] Int. Cl.⁶ .................................................. H02H 3/18
[52] U.S. Cl. ............................................. 361/84; 307/127
[58] Field of Search .................................. 361/84, 82, 86, 361/90, 18, 33, 245–246; 307/127; 257/355–360

[56] References Cited

U.S. PATENT DOCUMENTS

| | | | |
|---|---|---|---|
| 4,423,456 | 12/1983 | Zaidenweber | 361/77 |
| 4,679,112 | 7/1987 | Craig | 361/33 |
| 4,839,769 | 6/1989 | Soo et al. | 361/84 |
| 4,857,985 | 8/1989 | Miller | 307/127 |
| 4,958,251 | 9/1990 | Cini et al. | 361/84 |
| 5,012,381 | 4/1991 | Elliott et al. | 361/84 |
| 5,027,250 | 6/1991 | Cini et al. | 361/90 |
| 5,109,162 | 4/1992 | Koch et al. | 307/127 |
| 5,179,488 | 1/1993 | Rovner | 361/18 |
| 5,434,739 | 7/1995 | Heck | 361/84 |
| 5,517,379 | 5/1996 | Williams et al. | 361/84 |
| 5,519,557 | 5/1996 | Kopera, Jr. et al. | 361/84 |
| 5,539,610 | 7/1996 | Williams et al. | 361/246 |
| 5,546,264 | 8/1996 | Williamson et al. | 361/84 |
| 5,764,465 | 6/1998 | Mattes et al. | 361/77 |

*Primary Examiner*—Jeffrey Gaffin
*Assistant Examiner*—Michael Sherry
*Attorney, Agent, or Firm*—Tarolli, Sundheim, Covell, Tummino & Szabo

[57] ABSTRACT

Current flow between a battery (14) and electrical ground (18) and through a load (16) is controlled by an apparatus (10). Preferably, the load (16) is a seat heat element. A current direction sensitive MOSFET (34) acts as a switch to control the current flow. The MOSFET (34) has a source (40) connected to the load (16), a drain (42) intended for connection to a positive terminal (26) of the battery (14), and a gate (46) for receiving a control voltage. Transistors (56, 66) control the voltage at the gate (46) of the MOSFET (34). The apparatus (10) is self-protecting against damage upon reverse polarity connection of the battery (14). A switch-protecting resistor (36) is intended for connection to electrical ground (18). The switch-protecting resistor (36) provides a path for electrical energy from the battery (14) to the gate (46) of the MOSFET (34) when the battery (14) is reverse polarity connected.

10 Claims, 2 Drawing Sheets

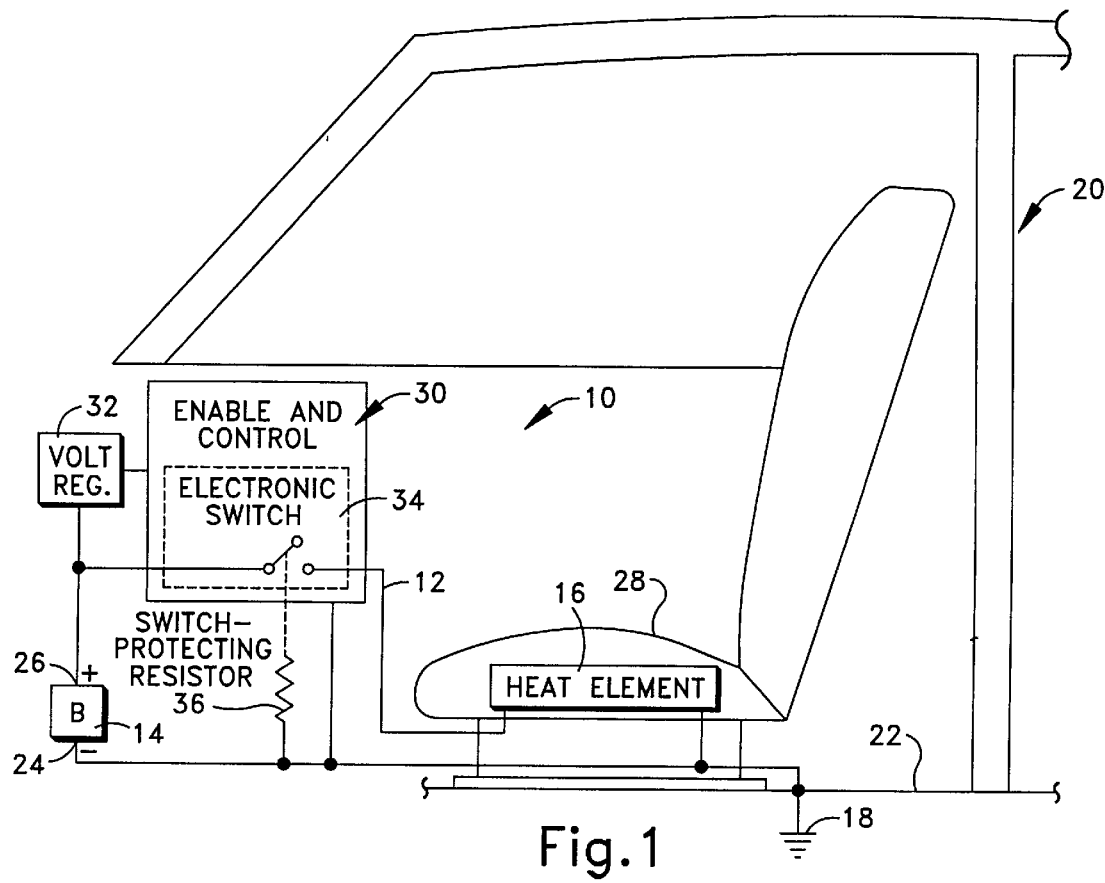
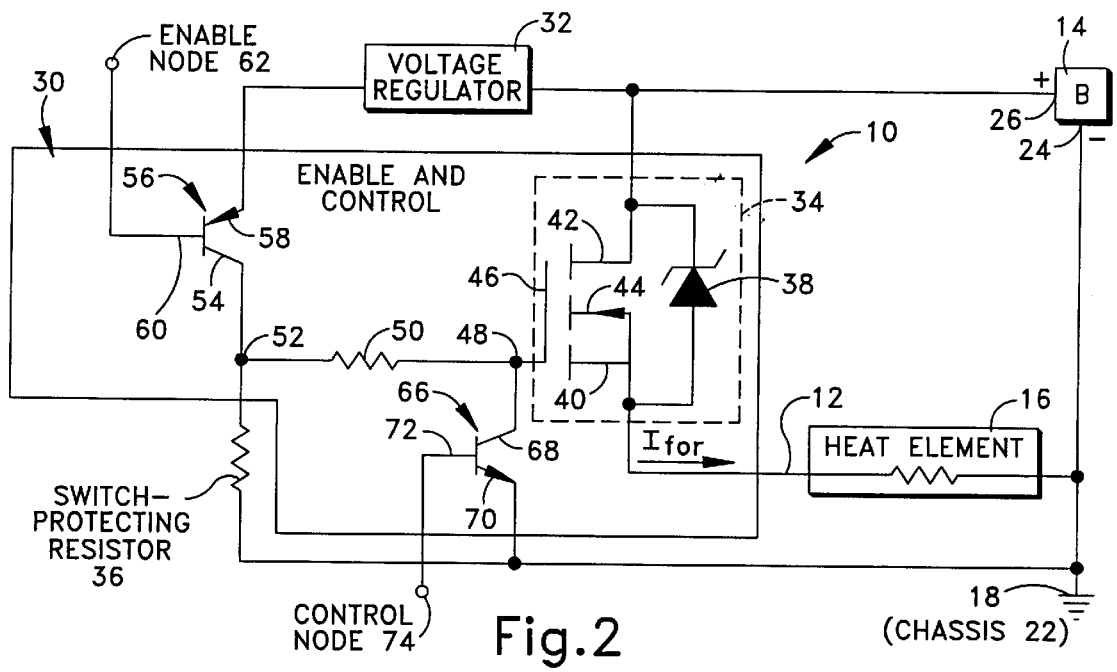
Fig.1
Fig.2

SELF-PROTECTING SWITCH APPARATUS FOR CONTROLLING A HEAT ELEMENT OF A VEHICLE SEAT AND A METHOD FOR PROVIDING THE APPARATUS

TECHNICAL FIELD

The present invention is generally directed to a switch apparatus for controlling current flow to a load, such as a seat heat element, connected to a power source. The present invention is particularly directed to a switch apparatus that includes protection circuitry for protecting against power source polarity reversal.

BACKGROUND OF THE INVENTION

Many electrical components, and particularly electronic components, may be damaged if a power source is incorrectly connected. One type of incorrect connection is reversal of the polarity connections of the power source. The problem regarding a reverse polarity connection is especially evident for electronics that are controlling current flows for load applications.

The use of electronic circuitry to control application loads is common place in modern vehicles. The use of such electronic circuitry has greatly increased the control capability within automobiles. However, along with the ever-increasing use of electronic circuitry in an automobile, there is a corollary increase in the need to protect electronic components against a reverse polarity connection of the electrical power source (i.e., the battery of the vehicle).

One type of switching FET includes a diode connected across the switching terminals of the FET (e.g., the source and drain terminals). The diode is commonly referred to as a parasitic diode. If the switching FET is properly connected to the battery, its diode is reversed biased. If the battery polarity connections are reversed, the diode becomes forward biased. High power dissipation occurs because of the forward biased diode and damage, such as diode burn out, can result.

One example of a switching FET that can be damaged by a reverse-connected battery is an N-channel MOSFET. The N-channel MOSFET has an internal diode, which connects the source and drain of the MOSFET. With the drain of the MOSFET connected to a supply voltage terminal of a battery, current can flow through the MOSFET and through an associated load without damage to the MOSFET. However, if the battery is reverse-connected (i.e., the source of the N-channel MOSFET is connected to the positive voltage terminal of the battery through the associated load) and the MOSFET is not turned "ON", the internal diode is forward biased. Such forward biasing of the internal diode may result in burnout of the MOSFET package.

SUMMARY OF THE INVENTION

In accordance with the one aspect of the present invention, an apparatus is provided, which controls current flow to a load from a power source and which protects itself upon reverse polarity connection of the power source. Current direction sensitive switch means controls the current flow to the load. The switch means has a first terminal connected to the load, a second terminal connectable to the power source, and a third terminal for receiving a control signal. Control means controls the signal at the third terminal of the switch means so as to controllably switch the switch means and control current flow to the load. A resistor has a terminal connectable to the power source. The resistor provides electrical energy to the third terminal of the switch means upon the reverse polarity connection of the power source to effect current flow through the switch means.

In accordance with another aspect, the present invention provides an apparatus which controls current flow to a load from a power source and which protects itself upon a reverse polarity connection of the power source. Transistor means controls the current flow to the load. The transistor means has a source terminal connected to the load, a drain terminal connectable to the power source, and a gate terminal. Control switch means controls the electrical voltage at the gate terminal of the transistor means. The control switch means includes a terminal connectable to the power source. A resistor has a terminal connectable to the power source for providing electrical energy to the gate terminal of the transistor means upon the reverse polarity connection of the power source to effect current flow through the transistor means.

In accordance with yet another aspect, the present invention includes a method for providing an apparatus. The apparatus controls current flow to a load from a power source and protects itself upon a reverse polarity connection of the power source. Current direction sensitive switch means is provided for controlling the current flow to the load. The step of providing the switch means includes providing a first terminal of the switch means for connection to the load, providing a second terminal of the switch means for connection to the power source, and providing a third terminal of the switch means for receiving a control signal. Control means is provided for controlling the signal at the third terminal of the switch means so as to controllably switch the switch means and control current flow to the load. A resistor is provided which has a terminal connected to electrical ground. The resistor provides electrical energy to the third terminal of the switch means upon the reverse polarity connection of the power source to effect current flow through the switch means.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein:

FIG. 1 is a schematic illustration of an apparatus in accordance with the present invention located within a vehicle;

FIG. 2 is a circuit diagram showing details of the apparatus of FIG. 1 connected to a battery in a desired manner.

DESCRIPTION OF PREFERRED THE EMBODIMENT

Figure 3:
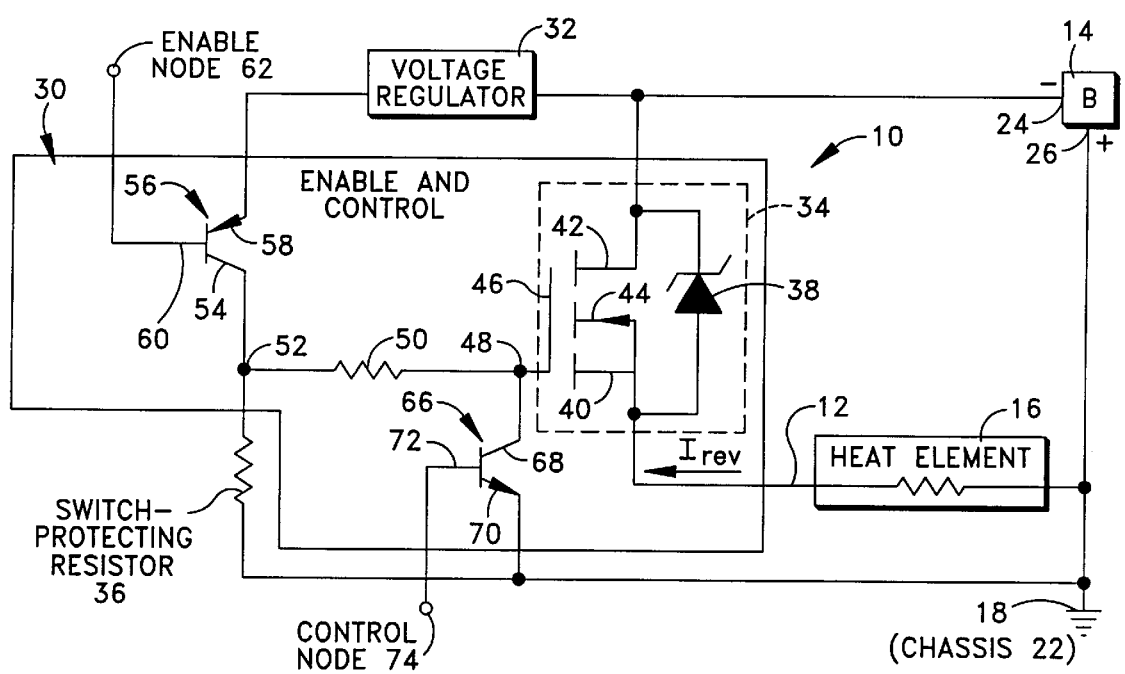
FIG. 3 is a view similar to FIG. 2, but shows the apparatus with the battery reverse polarity connected.

A representation of the present invention is schematically shown in FIG. 1 as embodied in a self-protecting switch apparatus 10. Preferably, the apparatus 10 is located within a vehicle 20. The apparatus 10 controls the flow of electrical current from a power source 14 through a load 16, via a line 12, to electrical ground 18. Preferably, the power source 14 is a battery. The electrical ground 18 of the vehicle 20 is connected to the chassis 22 of the vehicle and is referred to as the chassis ground. In a normal power connection, a negative battery terminal 24 of the battery 14 is connected to the chassis ground 18 and a positive battery terminal 26 of the battery is connectable to one terminal of the load 16 through the line 12.

In one preferred embodiment, the load 16 is a heat element for heating a seat 28 located within the vehicle 20. Typically, the heat element 16 has a resistance value of 2 ohms. The heat element 16 is connected at one of its terminals to the chassis ground 18. In order to supply heat to the seat 28, the heat element 16 is driven from the battery 14, which has a voltage value typically in the range of 10–16 volts dc.

The apparatus 10 includes an enable and control device 30. The enable and control device 30 is an electronic device that controls electrical current flow from the battery 14 to the heat element 16. The enable and control device 30 is connected to a regulated voltage supply 32. The regulated voltage supply 32 is, in turn, connected to the battery 14 and provides regulated electrical energy at a desired voltage value, preferably greater than the battery voltage.

Within the enable and control device 30 is an electronic switch 34 which is connected in series with the heat element 16, between the battery 14 and the chassis ground 18. The electronic switch 34 has an "open" or "OFF" state in which the connection between the battery 14 and the heat element 16 is interrupted. In the "OFF" state, electrical current does not flow through the heat element 16. The electronic switch 34 also has a "closed" or "ON" state in which current flows from the battery 14, through the electronic switch and the heat element 16.

The electronic switch 34 is a current direction sensitive switching device. Specifically, if the terminals 24 and 26 of the battery are connected ("a normal polarity connection") as shown in FIGS. 1 and 2, the electronic switch 34 operates in a desired manner. During such normal polarity connection, if the electronic switch 34 is in the "ON" state, electrical energy flows through the line 12, i.e., current $I_{for}$ (FIG. 2), and the heat element 16 is energized. If the electronic switch 34 is in the "OFF" state, electrical current does not flow to energize the heat element 16. In this "OFF" state, a voltage potential exists across the electronic switch. However, the electrical potential across the electronic switch 34 in this "OFF" state does not harm the electronic switch.

If the terminals 24 and 26 of the battery 14 are reverse connected (i.e., the positive terminal 26 is connected to the chassis ground 18 and the negative terminal 24 is connected to the electronic switch 34) as is shown in FIG. 3, the electronic switch 34 may be damaged. Specifically, if the electronic switch 34 is in its "ON" state, a current $I_{rev}$ will flow in the "opposite" direction through the line 12. However, if the electronic switch 34 is in its "OFF" state, a "reverse" voltage potential exists across the electronic switch. Such a reverse voltage potential may lead to damage of the electronic switch 34. This type of connection reversal is commonly known as a reversed battery condition. The "reversed battery condition" in a vehicle can result from the connector leads for the battery being switched. The "reverse battery condition" can also result if the battery 14 is "dead" and is improperly connected to an auxiliary battery during the "jumping" of the dead battery.

In order to prevent damage to electronic devices, such as the switch 34, the apparatus 10 (FIG. 1), in accordance with the present invention, includes a switch-protecting resistor 36 connected at one end to the chassis ground 18. In the preferred embodiment, the switch-protecting resistor 36 is a 100k ohm resistor. The switch-protecting resistor 36 functions to cause the electronic switch 34 to "close" (i.e., turn "ON") if the battery 14 is reverse connected, thereby avoiding a reverse potential across the electronic switch. With the electronic switch 34 "ON" for the reverse battery connection scenario, current $I_{rev}$ flows through the electronic switch, and damage is avoided.

Focusing now on the details of the apparatus 10 shown in FIG. 2, the electronic switch 34 of the enable and control device 30 is an N-channel MOSFET (metal oxide semiconductor, field-effect transistor). The MOSFET 34 has an internal diode 38 connected between its source 40 and drain 42. The source 40 is connected to the MOSFET's substrate 44, and is connected to the heat element 16 through line 12. The drain 42 of the MOSFET 34 is connected to the positive terminal 26 of the battery 14. In FIGS. 1 and 2, the connections to the battery 14 are as intended/desired (i.e., the battery is properly connected).

The state (i.e., ON/OFF) of the MOSFET 34 is controlled via the voltage level at a gate 46 of the MOSFET. The gate 46 of the MOSFET 34 is connected to a gate node 48. A resistor 50 (e.g., 100k ohm) connects the gate node 48 to a voltage supply node 52. The voltage supply node 52 is connected to a collector 54 of an "enable" PNP transistor 56 (e.g., an A06 type). An emitter 58 of the PNP transistor 56 is connected to the regulated voltage supply 32.

A base 60 of the PNP transistor 56 is connected to an enable node 62. The enable node 62 is connected to a suitable controlling source, such as an "awake" line of a micro-control port of a control module (not shown). When the PNP transistor 56 is turned "ON" via the enable node 62, the PNP transistor connects the voltage supply node 52 to the regulated voltage supply 32. Thus, the transistor 56 is connected to operate as a switch. The voltage potential at the voltage supply node 52 can bias the voltage at the gate node 48 to a "turn-on" voltage for the MOSFET 34.

The voltage at the gate node 48 is controlled by a "control" NPN transistor 66 (e.g., a 1413 type). A collector 68 of the NPN transistor 66 is connected to the gate node 48 and an emitter 70 of the transistor 66 is connected to the chassis ground 18. A base 72 of the NPN transistor 66 is connected to a control node 74. The control node 74 is connected to suitable circuitry for controlling operation of the NPN transistor 66. For example, the control node may be connected to a micro-control port, which, in turn, is controlled by a selector button or heater switch associated with the seat 28 which is to be heated. With the NPN transistor 66 in an "ON" state, the gate node 48 is connected to the chassis ground 18 and the voltage is biased to the ground voltage. When the NPN transistor 66 is in an "OFF" state, the gate node 48 is not connected to the chassis ground 18 through the transistor 66, and thus, the gate node 48 is permitted to rise to the MOSFET "turn-ON" voltage, as supplied through the PNP transistor 56. Thus, the transistor 66 is connected to operate as an ON/OFF switch for the seat heat element 16.

During operation, with the battery 14 properly connected, and with the enable PNP transistor 56 in an "ON" state and the control NPN transistor 66 in an "OFF" state, the MOSFET 34 is in an "ON" state, and current $I_{for}$ flows through the heat element 16. The heat element 16 provides heat to the seat 28, such that the seat is heated for the comfort of a seated occupant (not shown).

If the connections to the battery 14 are reversed (as described above and as shown in FIG. 3) and the resistor 36 was not present in the circuit, a negative potential would be applied to the drain 42 of the MOSFET 34. The internal diode 38 would become forward biased. Very high power dissipation would occur within the diode 38 of MOSFET package.

The switch-protecting resistor 36 is connected to the voltage supply node 52 to avoid the problem of the reverse voltage potential across the diode 38 when the battery 14 is reverse connected. Specifically, for the reverse battery condition and prior to MOSFET turn "ON", the source voltage of the MOSFET 34 is at one diode drop above the negative battery terminal 24. In the disclosed embodiment, this is approximately one volt or less. Also, because of the switch-protecting resistor 36, the gate 46 voltage is at the voltage of the positive terminal 26 of the battery 14. A sufficient gate-to-source voltage is present such that the MOSFET 34 turns "ON" with full enhancement. The MOSFET 34 conducts current $I_{rev}$ in the "reverse" direction. Low power dissipation occurs within the MOSFET package, and damage to the MOSFET package is avoided.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling current flow to a load from a power source and for protecting itself upon a reverse polarity connection of the power source, said apparatus comprising:

current direction sensitive switch means for controlling the current flow to the load, said switch means having a first terminal connected to the load, a second terminal connectable to the power source, and a third terminal for receiving a control signal;

control means for controlling the signal at said third terminal of said switch means so as to controllably switch said switch means and control current flow to the load; and a resistor, having a terminal connectable to the power source, for providing electrical energy to said third terminal of said switch means upon the reverse polarity connection of the power source to effect current flow through said switch means.

2. An apparatus as set forth in claim 1, wherein said switch means includes a MOSFET, said first terminal is a source terminal of said MOSFET, said second terminal is a drain terminal of said MOSFET, and said third terminal is a gate terminal of said MOSFET.

3. An apparatus as set forth in claim 2, wherein said switch means further includes a diode connected between said source and drain terminals of said MOSFET.

4. An apparatus as set forth in claim 3, wherein said resistor has a resistance value so that upon the reverse polarity connection of the power source, a gate to source voltage difference is present that is sufficiently large to turn ON said MOSFET.

5. An apparatus as set forth in claim 1, wherein said control means includes a transistor connectable to the power source for supplying the control signal to said third terminal of said switch means from the power source, and said resistor has a second terminal connected to said transistor.

6. An apparatus as set forth in claim 1, wherein said control means includes a transistor connectable to the power source for controlling application of the control signal to said third terminal of said switch means.

7. An apparatus as set forth in claim 1, wherein the load is a seat heat element having a resistance, and said switch means is in series with the seat heat element.

8. An apparatus for controlling current flow to a load from a power source and for protecting itself upon a reverse polarity connection of the power source, said apparatus comprising:

transistor means for controlling the current flow to the load, said transistor means having a source terminal connected to the load, a drain terminal connectable to the power source, and a gate terminal;

control switch means for controlling the electrical voltage at said gate terminal of said transistor means, said control switch means including a terminal connectable to the power source; and a resistor, having a terminal connectable to the power source, for providing electrical energy to said gate terminal of said transistor means upon the reverse polarity connection of the power source to effect current flow through said transistor means.

9. An apparatus as set forth in claim 8, wherein said transistor means includes an N-channel MOSFET.

10. A method for providing an apparatus for controlling current flow to a load from a power source and for protecting itself upon a reverse polarity connection of the power source, said method comprising:

providing current direction sensitive switch means for controlling the current flow to the load, including providing a first terminal of the switch means for connection to the load, providing a second terminal of the switch means for connection to the power source, and providing a third terminal of the switch means for receiving a control signal;

providing control means for controlling the signal at the third terminal of the switch means so as to controllably switch the switch means and control current flow to the load; and providing a resistor, having a terminal connected to electrical ground to provide electrical energy to the third terminal of the switch means upon the reverse polarity connection of the power source to effect current flow through the switch means.

* * * * *